United States Patent [19]

Kobunaya

[11] Patent Number: 5,185,713
[45] Date of Patent: Feb. 9, 1993

[54] PRODUCT ADDER FOR PERFOMING MULTIPLICATION OF FLOATING POINT DATA AND ADDITION OF FIXED POINT DATA

[75] Inventor: Hideki Kobunaya, Tokyo, Japan

[73] Assignee: NEC Corporation, Tokyo, Japan

[21] Appl. No.: 756,922

[22] Filed: Sep. 9, 1991

[30] Foreign Application Priority Data

Sep. 19, 1990 [JP] Japan ................................ 2-251287

[51] Int. Cl.⁵ .......................... G06F 7/50; G06F 7/52
[52] U.S. Cl. .................................. 364/748; 364/750.5
[58] Field of Search ........................... 364/748, 750.5

[56] References Cited

U.S. PATENT DOCUMENTS

| | | | |
|---|---|---|---|
| 4,683,547 | 7/1987 | DeGroot | 364/748 |
| 4,841,467 | 6/1989 | Ho et al. | 364/748 |
| 4,866,652 | 9/1989 | Chu et al. | 364/748 |
| 4,991,131 | 2/1991 | Yeh et al. | 364/748 |
| 4,999,802 | 3/1991 | Cocanougher et al. | 364/748 |

FOREIGN PATENT DOCUMENTS 2541795 8/1984 France .

OTHER PUBLICATIONS

Bernd Wolgast and Manfred Haverland, Schneller Gleitkommarechner fur Vektoroperationen, Elektronik 5, Mar. 6, 1987, pp. 91–100.

*Primary Examiner*—David H. Malzahn
*Attorney, Agent, or Firm*—Whitham & Marhoefer

[57] ABSTRACT

A product adder includes a data input memory, a multiplier, a shifter, a full adder, an accumulator, and a normalizing circuit. The memory stores two floating-point data. The multiplier performs multiplication of the floating-point data stored in the memory. The shifter converts the product of the multiplier into fixed-point data. The full adder performs cumulative addition of the fixed-point data output from the shifter. The accumulator holds output data from the full adder. The normalizing circuit converts the output data from the accumulator into floating-point data and outputting the converted data.

6 Claims, 6 Drawing Sheets

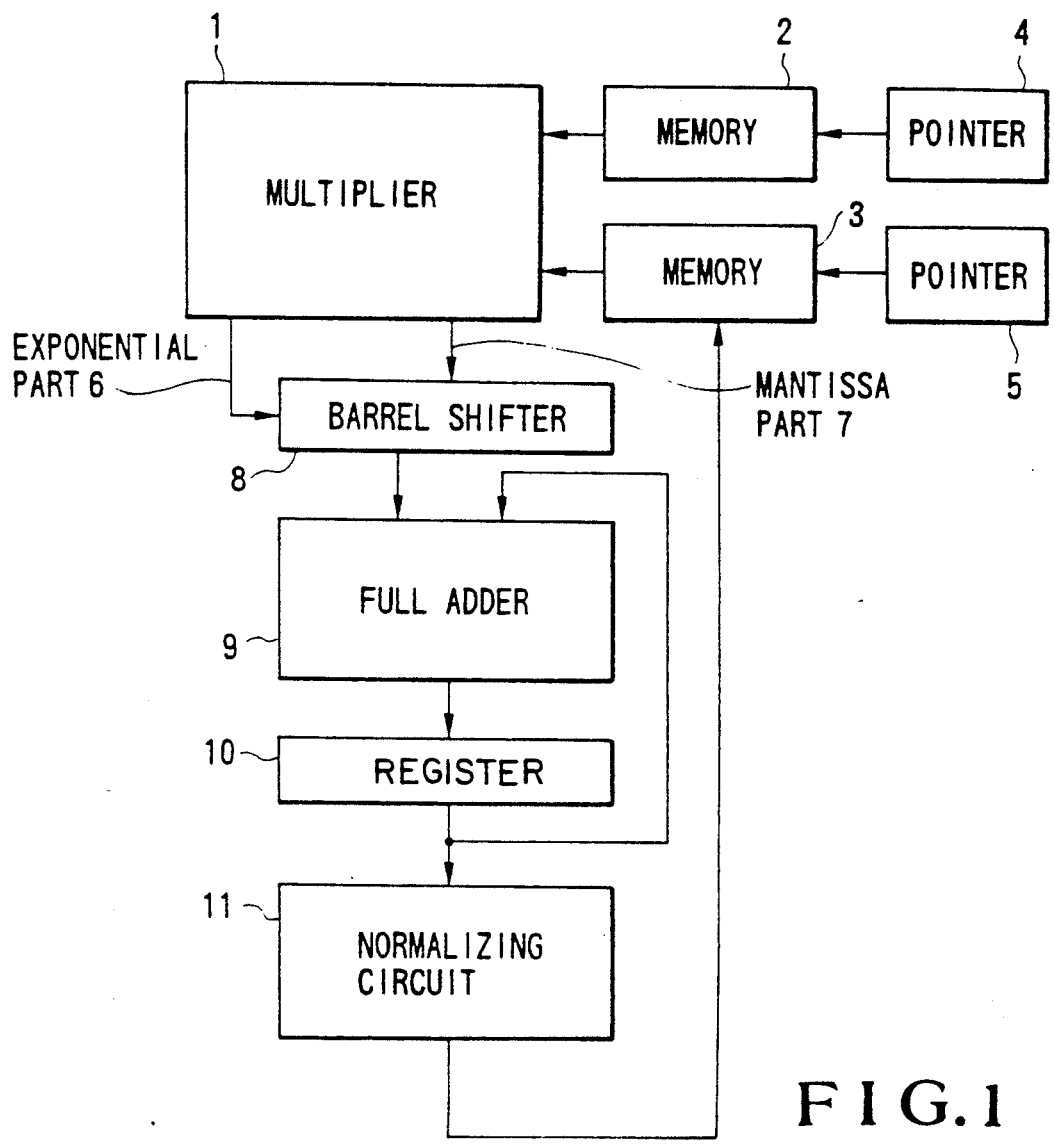
F I G. 1

PRODUCT ADDER FOR PERFOMING MULTIPLICATION OF FLOATING POINT DATA AND ADDITION OF FIXED POINT DATA

BACKGROUND OF THE INVENTION

The present invention relates to a product adder of a computer and, more particularly, to a product adder for performing multiplication of floating-point data and addition of fixed-point data.

FIG. 5 shows an arrangement of blocks of a conventional product adder, and FIG. 6 shows an arrangement of blocks of another conventional product adder.

Conventionally, a product adder for processing fixed-point data in both multiplication and addition has an arrangement as shown in FIG. 5. An example of execution of $AX1+BX2$ ($A=0.1100000B$, $X1=0.1110000B$, $B=0.1010000B$, and $X2=0.1010000B$ where B represents binary notation)

will be described below with reference to FIG. 5.

When addresses of data as inputs to a multiplier are set in pointers 19 and 20, two 8-bit fixed-point data $A=0.1100000$, $X1=0.1110000$ are read out from memories 17 and 18, respectively. A multiplier 16 performs multiplication of the readout fixed-point data and outputs 16-bit fixed-point data $AX1=0.101010000000000B$.

Eight upper bits 01010100 of the output data are stored in a register 21, and its eight lower bits 00000000 are stored in a register 22. The contents of the register 22, i.e., the eight lower bits 00000000 are selected by a multiplexer 23 and added to a value (initially, 00000000) stored in an accumulator 25 by a full adder 24. The sum is stored in the accumulator 25.

Subsequently, the contents of the register 21, i.e., the eight upper bits 01010100 are selected by the multiplexer 23 and added to a value (initially, 00000000) stored in an accumulator 26 by the full adder 24. The sum is stored in the accumulator 26. When addresses of data for performing multiplication are set in the pointers 19 and 20, two 8-bit fixed-point data $B=0.1010000B$, $X2=0.1010000B$ are read out from the memories 17 and 18, respectively, and the multiplier 16 performs multiplication of the readout fixed-point data and outputs 16-bit fixed-point data $BX2=0.011001000000000B$.

Eight upper bits 00110010 of the output data are stored in the register 21, and its eight lower bits 00000000 are stored in the register 22.

The contents of the register 22, i.e., the eight lower bits 00000000 are selected by the multiplexer 23 and added to 00000000 stored in the accumulator 25 by the full adder 24, i.e., addition 0000000+00000000 is executed by the full adder 24. The sum 00000000 is stored in the accumulator 25. The contents of the register 21, i.e., the eight upper bits 00110010 are selected by the multiplexer 23 and similarly added to 01010100 stored in the accumulator 26 by the full adder 24, i.e., addition 00110010+01010100 is executed by the full adder 24. The sum causes an overflow. Therefore, as overflow processing, a positive maximum value 01111111 is taken as the sum and stored in the accumulator 26. A sum of the values of the accumulators 25 and 26, i.e., 0.111111100000000B is stored as a product sum in the memory 18.

An example of execution of product addition $AX1+BX2$ ($A=0.11000\times2^{00}$, $X1=0.11100\times2^{00}$, $B=0.10100\times2^{00}$, and $X2=0.10100\times2^{00}$)

performed in a conventional product adder for processing floating-point data in both multiplication and addition will be described below with reference to FIG. 6.

When addresses of input data to a multiplexer 1 are set in pointers 4 and 5, two 8-bit floating-point data $A=0.11000\times2^{00}$, $X1=0.11100\times2^{00}$ each having a two-bit exponential part and a six-bit mantissa part are read out from memories 2 and 3, and a multiplier 1 performs multiplication of the readout floating-point data. The product $AX1=0.10101000000\times2^{00}$ (exponential part = two bits, mantissa part = 12 bits)

is stored in a register 27. The product AX1 is stored in an accumulator 33 via a switch 30, a barrel shifter 31, and a full adder 32.

When addresses of input data to the multiplier 1 are set in the pointers 4 and 5, two 8-bit floating-point data $B=0.10100\times2^{00}$, $X2=0.10100\times2^{00}$ each having a two-bit exponential part and a six-bit mantissa part are read out from the memories 2 and 3, respectively, and the multiplier 1 performs multiplication of the readout floating-point data. The product $BX2=0.01100100000\times2^{00}$ (exponential part = two bits, mantissa part = 12 bits)

is stored in the register 27. The value $AX1=0.10101000000\times2^{00}$ (exponential part = two bits, mantissa part = four bits)

of the accumulator 33 is stored in the register 28.

Subsequently, an EAU (Exponent Arithmetic Unit) 29 compares the exponential parts 00B of the data BX2 and AX1 stored in the registers 27 and 28, and the barrel shifter 31 shifts the digits of the mantissa parts of the data AX1 and BX2 so that a smaller exponential part becomes equal to a larger exponential part. In this embodiment, no shifting is performed by the barrel shifter 31 because the two exponential parts are the same.

The full adder 32 performs addition of the mantissa parts of the data AX1 and BX2. That is, 0.10101000000B+0.01100100000B is executed. This sum of the mantissa parts is 1.00011000000B, i.e., causes an overflow. Therefore, the following compensation of floating-point addition is performed. That is, the mantissa part is shifted to the right by one bit by the shifter 34, and "1" is added to the output 00B from the EAU 29 as the exponential part to obtain 01B. The mantissa part 0.10000110000B is stored in 12 lower bits of the accumulator 33, and the exponential part 01B is stored in its two upper bits. The value of the accumulator 33, i.e., $0.100001\,10000 \times 2^{01}$ is stored as a product sum in the memory 3.

However, in the above conventional product adder for processing fixed-point data in both multiplication and addition, the number of bits as an output result of the 6-bit × 6-bit multiplier is 12. Therefore, addition is performed twice for the upper and lower bits in the 12-bit full adder, resulting in a low operation speed. In addition, since the number of bits of a product sum is doubled, the size of a memory for storing the sum is increased. Furthermore, the dynamic range of data to be processed is limited to degrade accuracy.

In the above conventional product adder for processing floating-point data in both multiplication and addition, the circuit size is increased, and the size of a memory for storing data is increased.

SUMMARY OF THE INVENTION

It is an object of the present invention to provide a product adder in which a circuit size is decreased to increase an operation speed.

It is another object of the present invention to provide a product adder in which a dynamic range can be widened to realize high-accuracy product addition.

It is still another object of the present invention to provide a product adder in which the size of a memory for storing data is decreased.

In order to achieve the above objects of the present invention, there is provided a product adder comprising a data input memory for storing two floating-point data, a multiplier for performing multiplication of the floating-point data stored in the memory, a shifter for converting the product of the multiplier into fixed-point data, a full adder for performing cumulative addition of the fixed-point data output from the shifter, an accumulator for holding output data from the full adder, and a normalizing circuit for converting the output data from the accumulator into floating-point data and outputting the converted data.

BRIEF DESCRIPTION OF THE DRAWINGS

FIG. 1 is a block diagram showing an arrangement of a product adder according to an embodiment of the present invention;

DETAILED DESCRIPTION OF THE PREFERRED EMBODIMENTS

Figure 2A:
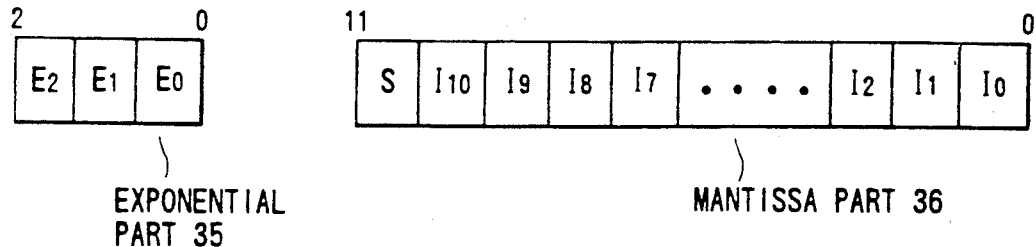
FIGS. 2A to 2D are views for explaining an operation of a barrel shifter of the product adder of the present invention.

Embodiments of the present invention will be described below with reference to the accompanying drawings. FIG. 1 shows an arrangement of blocks of a product adder according to an embodiment of the present invention. Referring to FIG. 1, the product adder comprises memories 2 and 3 as first and second storage devices for storing two floating-point data, and a multiplier 1 for performing multiplication of the floating-point data stored in the memories 2 and 3.

The present invention is characterized by comprising a barrel shifter 8 as a shifter for converting the product of the multiplier 1 into fixed-point data, a full adder 9 for performing cumulative addition of the fixed-point data output from the barrel shifter 8, an register 10 for holding output data from the full adder 9, a normalizing circuit 11 for converting output data from the register 10 into floating-point data, and a third storage circuit for storing the floating-point data output from the normalizing circuit 11.

The memory 3 includes means serving as the third storage circuit for storing the floating-point data output from the normalizing circuit 11.

An operation of the product adder having the above arrangement will be described below. FIGS. 2A to 2D explain an operation of the barrel shifter of the product adder of the present invention, and FIGS. 3A to 3C explain an operation of the normalizing circuit of the product adder of the present invention.

An example of execution of $AX1 + BX2$ ($A = 0.11000 \times 2^{00}$, $X1 = 0.11100 \times 2^{00}$, $B = 1.10100 \times 2^{00}$, and $X2 = 0.10100 \times 2^{00}$)

in the arrangement shown in FIG. 1 will be described below. In this case, the exponential part represents a negative number. For example, $A = 0.75 \times 2^{-0}$. When addresses of input data to the multiplier 1 are set in the pointers 4 and 5, two 8-bit floating-point data $A = 0.11000 \times 2^{00}$, $X1 = 0.11100 \times 2^{00}$ each having a two-bit exponential part and a six-bit mantissa part are read out from the memories 2 and 3, respectively, and the multiplier 1 performs multiplication of the readout floating-point data. The product is given by:

$AX1 = 0.10101000000 \times 2^{000}$.

This product AX1 {a three-bit (including a carry) exponential part 6 and a 12-bit mantissa part 7} is converted into 12-bit fixed-point data by the barrel shifter 8.

An operation of the barrel shifter 8 will be described below with reference to FIGS. 2A to 2D.

Figure 2B:
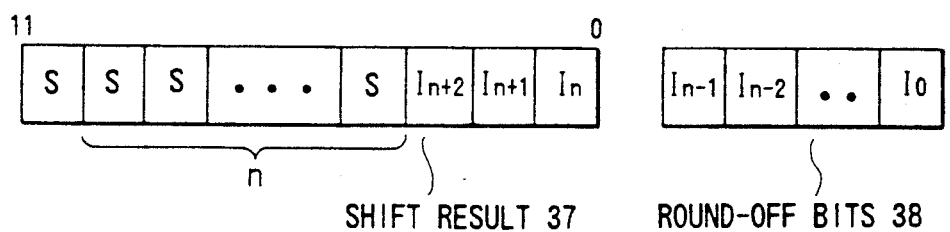
Figure 2C:
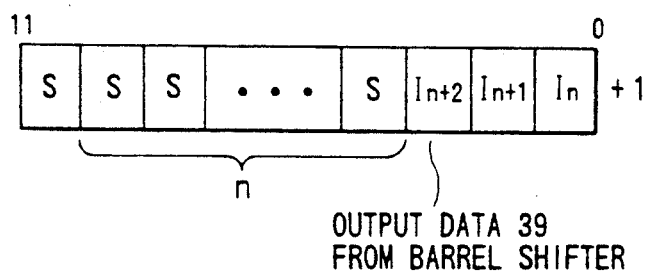
Figure 2D:
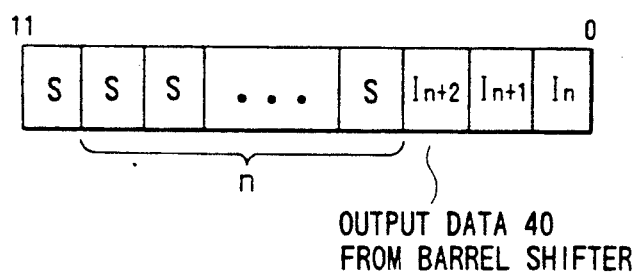

Assume that an exponential part 35 and a mantissa part 36 as shown in FIG. 2A are inputs to the barrel shifter 8. The exponential part is assumed to represent a decimal number n. When the mantissa part is shifted to right by n bits, a shift result 37 is obtained as shown in FIG. 2B. However, the value of the MSB (sign bit) is held. "1" is added by a most significant bit $I_{n-1}$ of round-off bits 38 to perform a carry operation, thereby determining an output from the barrel shifter 8. That is, the output from the barrel shifter is output data 39 shown in FIG. 2C when $I_{n-1} = 1$ or is output data 40 shown in FIG. 2D otherwise.

As described above, the product $AX1 = 0.10101000000 \times 2^{00}$ is converted into 12-bit fixed-point data $AX1 = 0.10101000000$ by the barrel shifter 8, and this data AX1 is subjected to cumulative addition by the full adder 9. The product is stored in the register 10 to set the value of the register 10 to be 0.10101000000. When addresses of input data to the multiplier 1 are set in the pointers 4 and 5, two 8-bit floating-point data $$B = 1.10100 \times 2^{00}, X2 = 0.10100 \times 2^{00}$$

each having a two-bit exponential part and a six-bit mantissa part are read out from the memories 2 and 3, respectively, and the multiplier 1 performs multiplication of the readout floating-point data. The product is given by:

$$BX2 = 1.11000100000 \times 2^{000}.$$

Similar to the data AX1, this product BX2 {a three-bit (including a carry) exponential part 6 and a 12-bit mantissa part 7} is converted into 12-bit fixed-point data $$BX2 = 1.11000100000$$

by the barrel shifter 8. The data BX2 converted into the 12-bit fixed-point data is added to the data $$AX1 = 0.10101000000$$

stored in the accumulator 10 by the full adder 9. The sum $$AX1 + BX2 = 0.01101100000$$

is stored in the accumulator 10. The data (AX1+BX2) stored in the accumulator 10 is normalized into 8-bit floating-point data having two bits of an exponential part and six bits of a mantissa part by the normalizing circuit 11.

An operation of the normalizing circuit 11 will be described below with reference to FIGS. 3A to 3C.

Figure 3A:
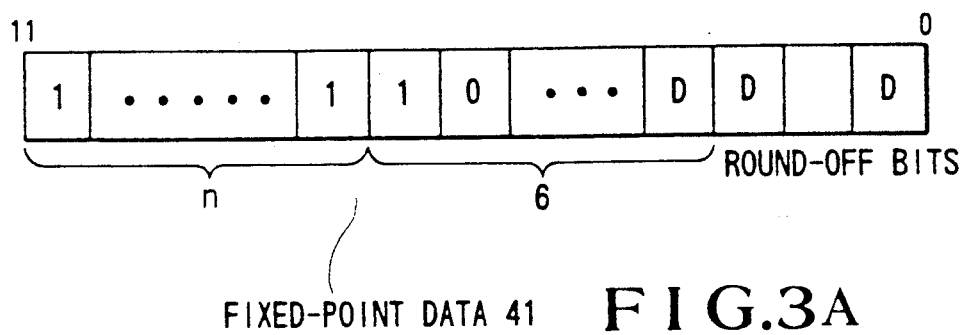
FIGS. 3A to 3C are views for explaining an operation of a normalizing circuit of the product adder of the present invention.
Figure 3B:
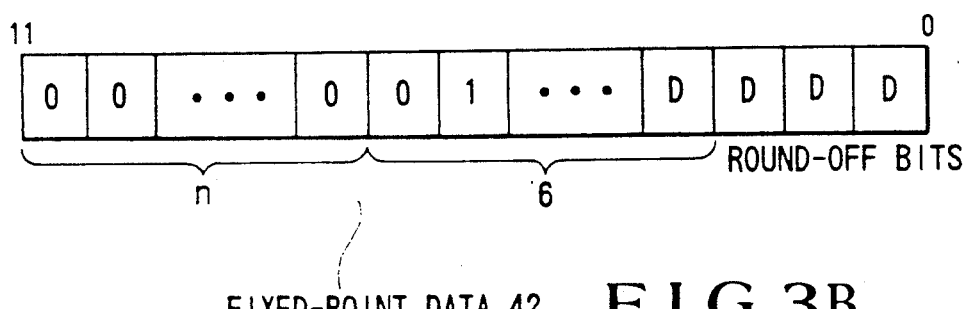
Figure 3C:
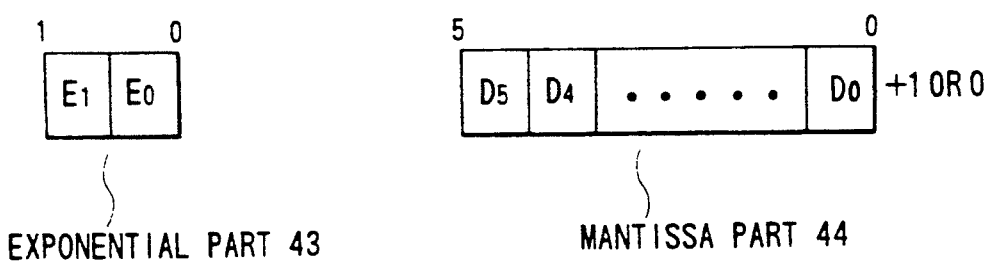

Assume that 12-bit fixed-point data 41 or fixed-point data 42 as shown in FIG. 3A or 3B is an input to the normalizing circuit 11. If $n+1$ ($n \leq 3$) "1"s or "0"s continue, n is represented by a 2-bit binary number as an exponential part 43, as shown in FIG. 3C. The 12-bit fixed-point data 41 or 42 is barrel-shifted to the left by n bits, and six upper bits are taken as a mantissa part. When round-off bits are present, a carry operation is performed. If the MSB of the round-off bits is "1", "1" is added to the mantissa part. As a result, the exponential part 43 and a mantissa part 44 are obtained as an output.

As described above, $$AX1 + BX2 = 0.01101100000$$

is converted into $0.11011 \times 2^{01}$ by the normalizing circuit 11 and stored in the memory 3.

Figure 4:
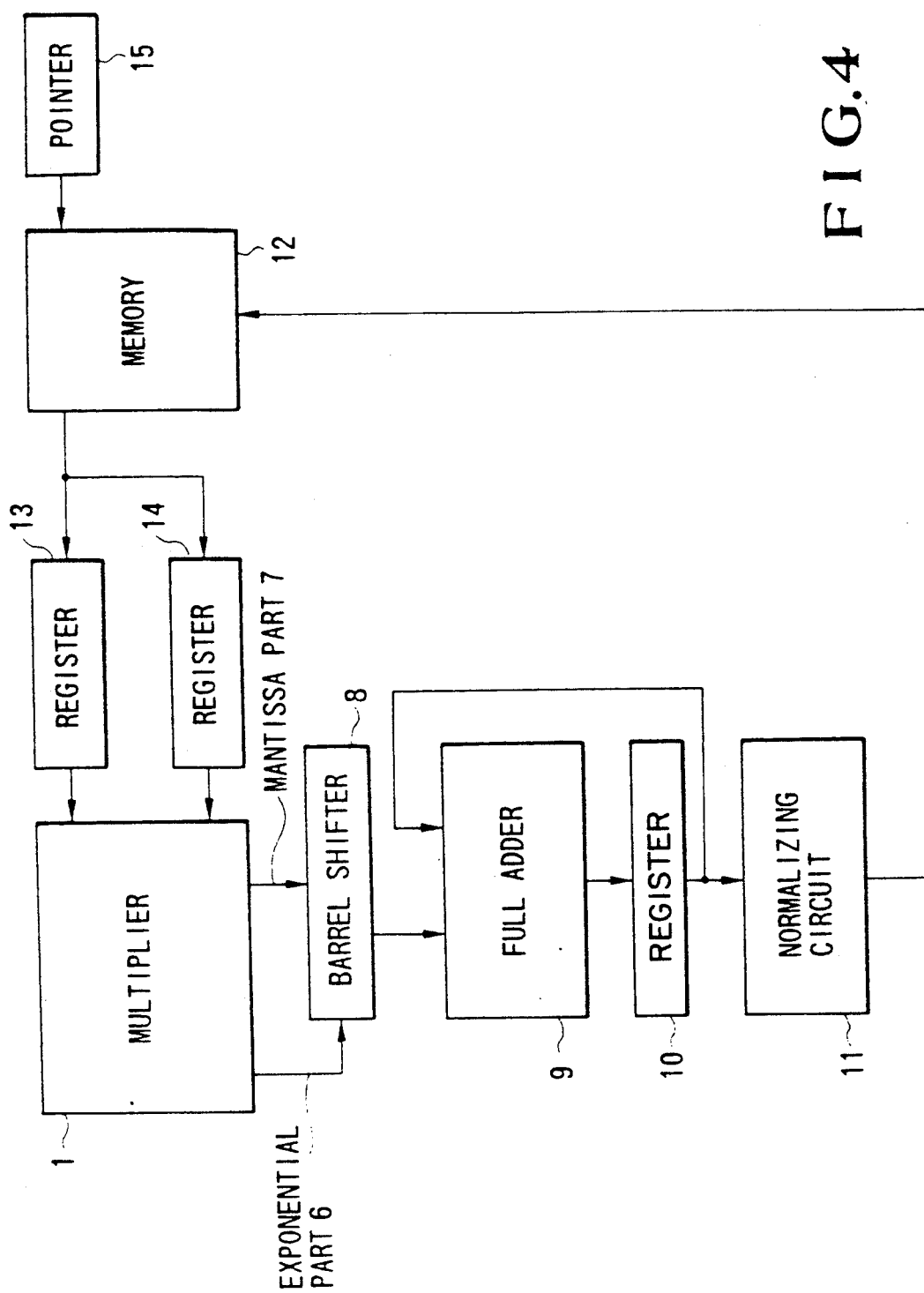
FIG. 4 is a block diagram showing an arrangement of a product adder according to another embodiment of the present invention.
Figure 5:
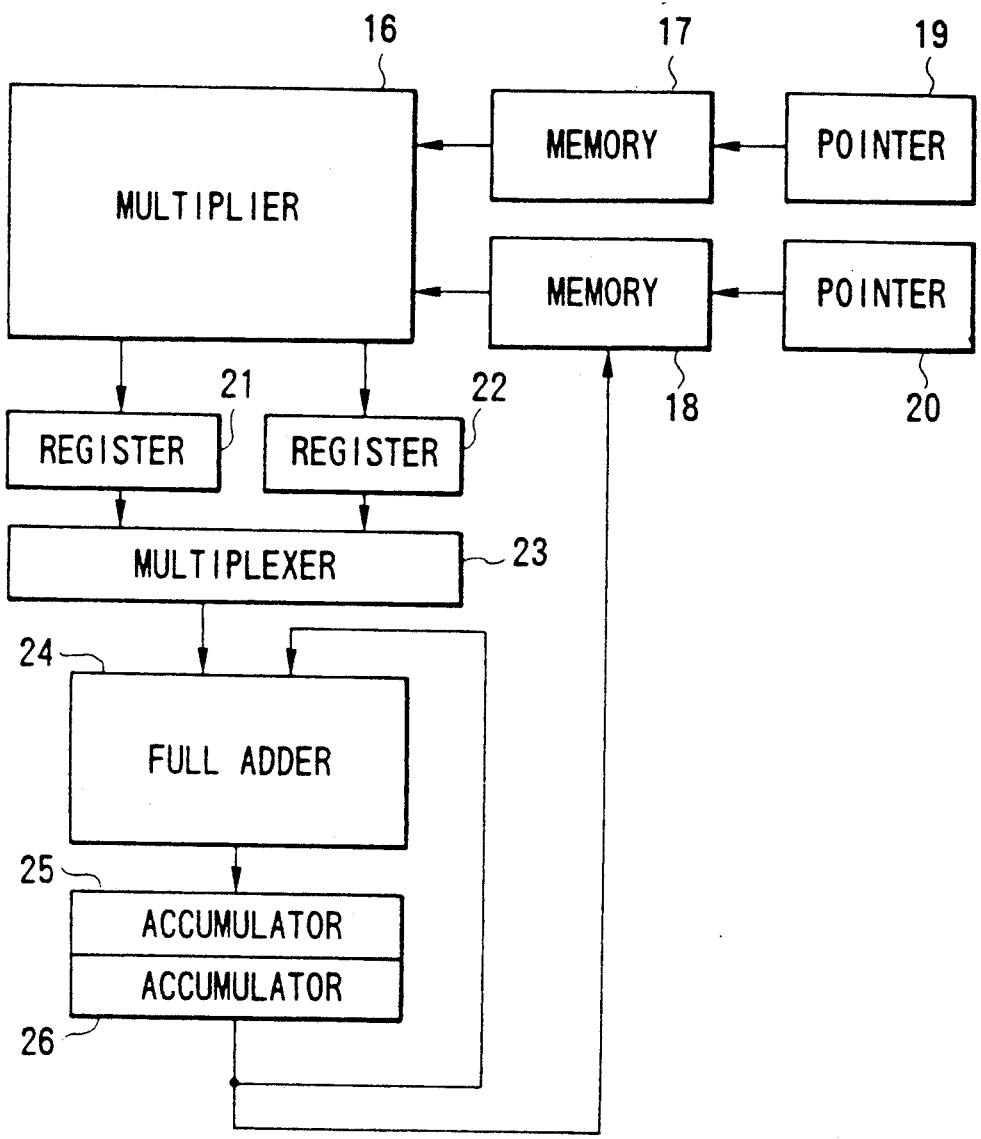
FIG. 5 is a block diagram showing an arrangement of a conventional product adder.
Figure 6:
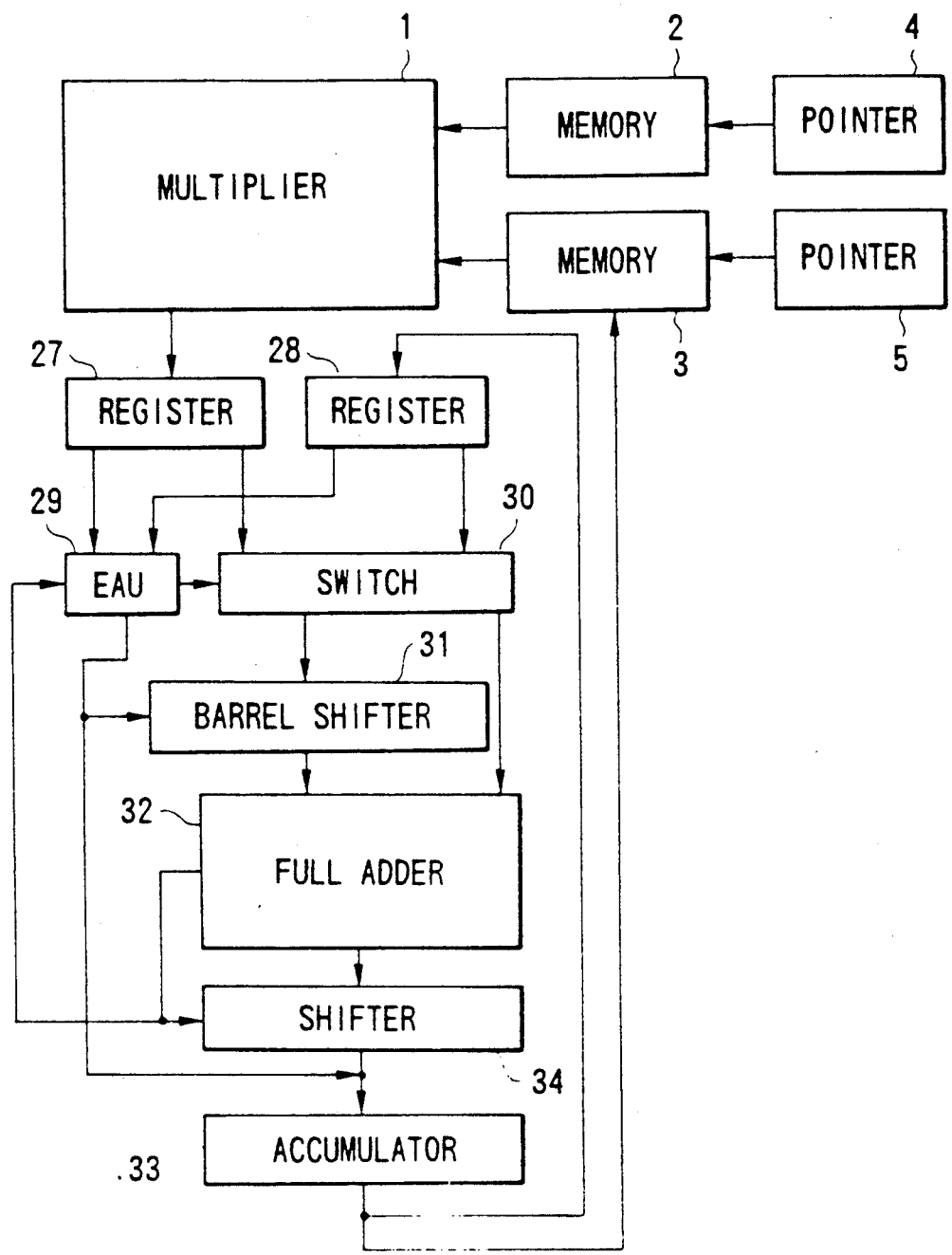
FIG. 6 is a block diagram showing an arrangement of a conventional product adder.

FIG. 4 shows an arrangement of blocks of another embodiment of the present invention. Referring to FIG. 4, a multiplier 1 is connected to registers 13 and 14 for storing input data to the multiplier 1. The output terminal of a memory 12 is connected to the registers 13 and 14.

In the arrangement shown in FIG. 4, when addresses of two input data to the multiplier are set and transferred to the registers 13 and 14 by a pointer 15, data input is started, and an output from a normalizing circuit 11 is stored in the memory 12. In this embodiment, data as an object to be arithmetically operated and an arithmetic operation result are stored in a single common memory.

As has been described above, according to the present invention, since a dynamic range can be widened without increasing a circuit size, product addition can be effectively performed with high accuracy. In addition, since an arithmetic operation result is stored in a memory after it is normalized and converted into floating-point data, the size of a memory can be advantageously decreased.

What is claimed is:

1. A product adder comprising:
    a data input memory for storing floating-point data;
    a multiplier for performing multiplication of the floating-point data stored in said memory;
    a shifter for converting the product of said multiplier into fixed-point data;
    a full adder for performing cumulative addition of the fixed-point data output from said shifter;
    a register for holding output data from said full adder; and
    a normalizing circuit for converting the output data from said register into floating-point data and outputting the converted data.

2. An adder according to claim 1, wherein said data input memory is constituted by first and second memories each for storing floating-point data.

3. An adder according to claim 1, further comprising a third memory for storing the floating-point data output from said normalizing circuit.

4. An adder according to claim 3, wherein said data input memory and said third memory are constituted by a single common memory.

5. An adder according to claim 4, further comprising first and second registers for temporarily holding the two floating-point data stored in said common memory and supplying the data to said multiplier.

6. An adder according to claim 1, wherein said shifter is a barrel shifter.

* * * * *